Sept. 18, 1962 PAUL K. CHUNG 3,054,253
CASE-BONDING OF DOUBLE-BASE PROPELLANT GRAIN BY
USING SILICONE ELASTOMERS
Filed Dec. 31, 1958

INVENTOR.
PAUL K. CHUNG
BY
P. H. Firsht
ATTORNEY.

United States Patent Office 3,054,253
Patented Sept. 18, 1962

3,054,253
CASE-BONDING OF DOUBLE-BASE PROPELLANT GRAIN BY USING SILICONE ELASTOMERS
Paul K. Chung, China Lake, Calif., assignor to the United States of America as represented by the Secretary of the Navy
Filed Dec. 31, 1958, Ser. No. 784,399
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to the bonding of propellant grains to rocket motor tubes and to a method of doing same.

Double-base, nitrocellulose-nitroglycerin, propellant grains have never been successfully case bonded to motor tubes because the joints formed were rigid and the vast difference in coefficients of thermal expansion between the grain and the metal tube would not permit temperature cycling over a very wide range without fracture of the grain or the joint.

To permit temperature cycling over the range dictated by military considerations, double-base grains have heretofore been securely positioned in motor tubes with the aid of intricate supporting structure in such a fashion that the grain and the tube were never quite in contact.

The grain supporting structure not only required more work on constructing the motor tube and added more weight thereto but took up an appreciable amount of space inside the tube which could not be occupied by propellant. Furthermore, such motor tubes require special cushioning containers for normal transportation and handling, and are inadequate for use in rockets which must have a high spin velocity.

It is therefore an object of this invention to provide a rocket motor in which the propellant grain is secured directly to the motor tube.

Another object is to provide a motor having more thrust than those of prior design using the same propellant.

Still another object is to provide a lighter rocket than has heretofore been possible with double-base propellants.

Yet another object is to provide a rocket in which the case-bonded grain will not become detached when a high spin velocity is imparted to the rocket.

Another object is to provide a rocket having the aforementioned qualities which does not require a special container for normal handling and transportation.

A final object is to provide an improved method for bonding a propellant grain to a motor tube which will afford the aforementioned advantages.

The objects are accomplished by bonding the grain integrally to the motor tube with an adhesive which forms a non-rigid joint. The adhesive is an elastomeric silicone polymer capable of stretching many times its original length. It is especially suitable for such bonding because its physical properties are practically independent of temperature, it is inert to the ingredients in the grain, and is practically impermeable to nitroglycerin and to the conventional nitrocellulose plasticizers.

Figure 1:
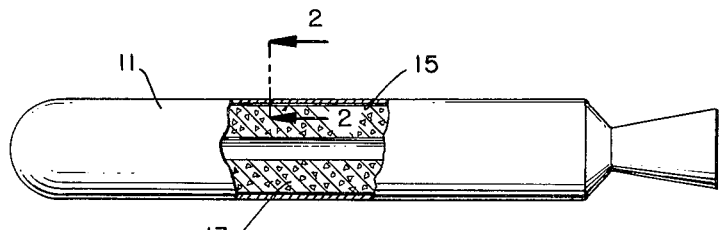
FIG. 1 is a side elevation of a rocket motor, partly in section.
Figure 2:
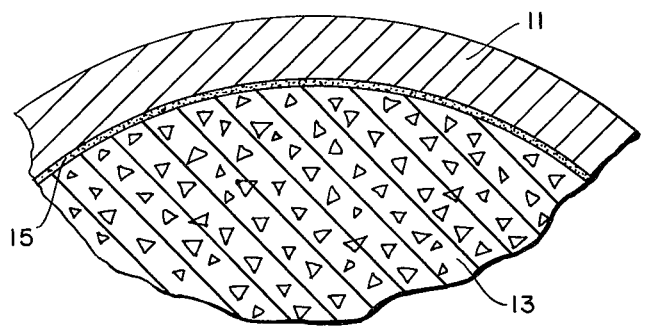
FIG. 2 is an enlarged section taken on line 2—2 of FIG. 1.

Referring now to FIG. 1 a rocket motor tube 11 is shown containing a solid propellant grain 13, both of which are of conventional construction, the grain being bonded to the tube by an adhesive 15 which will now be described in detail.

The adhesive used is fully described in U.S. Patent No. 2,736,721. It is composed of (a) a solvent of aliphatic hydrocarbons, aromatic petroleum derivatives, or halogenated hydrocarbons, such as n-heptane, benzene, or ethylene dichloride, (b) a silicone resin copolymer of $R_3SiO_{1/2}$ and $SiO_2$ where R is an alkyl radical of less than 4 carbon atoms or a phenyl radical, and where the ratio of $R_3SiO_{1/2}$ units to $SiO_2$ units is between 0.6 and 0.9, and (c) a benzene-soluble diorganosiloxane having the general formula of

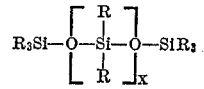

where R is methyl or phenyl and X is a number that will give this compound a viscosity of at least 1,000,000 cs. at 25° C. In each of the ingredients (b) and (c), at least 90% of the total number of R radicals are alkyl. In effect, a more stable compound is obtained if the R radicals are 100% methyl.

The resin copolymer (b) can be a two component copolymer composed essentially of $R_3SiO_{1/2}$ and $SiO_2$ units in the above-defined ratio. Resin (b) may also contain a limited amount of $R_2SiO$ units. In this event the total amount of $R_3SiO_{1/2}$ units plus $R_2SiO$ units is from 0.6 to 0.9, inclusive. The diorganosiloxane units may be present in resin (b) in an amount up to 0.2 per $SiO_2$ unit.

The preferred adhesive mixture is one containing 50% by weight each of (b) and (c) above, all the R radicals being methyl. 35% by weight of this mixture is added to 65% by weight of xylene or n-heptane as solvent. This solution is then ready for use.

The elastomer in solution is applied either to the bare or cloth-wrapped grain by dipping, brushing, or spraying or a silicone-impregnated tape is wrapped onto the grain to provide an adhesive layer upon evaporation of the solvent.

The grain is then cooled to the lowest temperature permissible without exceeding the brittle point of the grain, in order to reduce the diameter of the grain so that it will fit inside the tube. A small amount of silicone lubricating oil, preferably one having the composition of

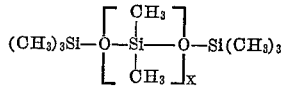

where $X=3$ to 50, is rubbed on the adhesive surface.

The grain is pushed into the tube and positioned with the aid of an alignment jig. Then the grain is allowed to warm up, whereupon its diameter increases, causing the grain to grip the tube firmly thus forming the bond whereupon the jig is removed. The silicone adhesive is not a true adhesive in that it does not set to a hard bond but remains soft, elastic, and sticky indefinitely. Further, the bond, if broken, will be reestablished upon the application of sufficient pressure.

An interference fit between the tube and the adhesive-coated grain at room temperature is generally desirable. The amount that the grain is oversize is a function of the diameter of the grain and the coefficient of linear expansion of the grain, but as a general rule, the oversize should not exceed 75% of the shrinkage of the grain when cooled to shrink fitting temperature.

Motors so made have been temperature cycled between −65° F. and 165° F. for as many as a dozen cycles with no development of cracks in the grain as determined by X-rays of the grain afterwards.

Such motors have been dropped from heights of eight feet onto a hard surface with no breaking of the bond or the propellant grain.

Static firings have shown that the stresses of ignition do not crack the propellant grain or the bond.

From the foregoing it is obvious that a significant advance has been made in the art.

Obviously, many modifications and variations of the present invention are possible in the light of the above teachings. It is therefore to be understood that within the scope of the appended claims the invention may be practiced otherwise than as specifically described.

What is claimed is:

In a rocket motor, in combination, a metal tube, a solid propellent grain within the tube, said grain consisting essentially of nitrocellulose and nitroglycerin, and a layer of elastomeric silicone composition between the tube and the grain and bonded to each for securing the grain in the tube, said composition consisitng essentially of equal weights of each of (a) a benzene soluble resin copolymer composed essentially of structural units of $SiO_2$ and $R_3SiO_{1/2}$ where R is a monovalent hydrocarbon selected from the group consisting of alkyl radicals of less than 4 carbon atoms and phenyl and at least 90% of the total number of R radicals are alkyl and in said copolymer the ratio of $R_3SiO_{1/2}$ units to $SiO_2$ units is between 0.6 to 0.9 inclusive and (b) a benzene soluble organosiloxane of at least 1,000,000 centistokes viscosity at 25° C., said organosiloxane having the general formula $R'_2SiO$ wherein R' is a monovalent hydrocarbon radical selected from the group consisting of methyl and phenyl and at least 90% of the total number of R' radicals are methyl.

References Cited in the file of this patent

UNITED STATES PATENTS

| | | |
|---|---|---|
| 1,453,933 | Gibbons et al. | May 1, 1923 |
| 2,122,996 | Williams | July 5, 1938 |
| 2,539,404 | Crutchfield et al. | Jan. 30, 1951 |
| 2,563,265 | Parsons | Aug. 7, 1951 |
| 2,736,721 | Dexter | Feb. 28, 1956 |
| 2,877,504 | Fox | Mar. 17, 1959 |